United States Patent [19]
Fraering, Jr.

[11] Patent Number: 5,852,962
[45] Date of Patent: Dec. 29, 1998

[54] APPARATUS FOR RECONDITIONING THREADED TUBULAR CONNECTION SEAL SHOULDERS

[76] Inventor: Camille M. Fraering, Jr., 2408 Blue Haven Dr., New Iberia, La. 70560

[21] Appl. No.: 841,275

[22] Filed: Apr. 29, 1997

[51] Int. Cl.$^6$ ................................ B23B 3/24; B23B 5/16
[52] U.S. Cl. ................................ 82/128; 82/131; 82/113; 451/359
[58] Field of Search ............................. 82/128, 113, 131; 451/430, 359

[56] References Cited

U.S. PATENT DOCUMENTS

| | | | |
|---|---|---|---|
| 2,092,637 | 9/1937 | Brown | 82/128 |
| 2,528,474 | 10/1950 | Moore | 82/128 X |
| 4,665,780 | 5/1987 | Plaquin et al. | 82/113 X |
| 5,433,130 | 7/1995 | Smith et al. | 82/128 X |

*Primary Examiner*—Daniel W. Howell
*Assistant Examiner*—Henry W. H. Tsai
*Attorney, Agent, or Firm*—Jesse D. Lambert

[57] ABSTRACT

Apparatus for reconditioning the seal shoulders of threaded tubular connections, whether of single or multiple seal shoulder configuration, which non-threadably engages the connection for alignment. For box connections, the apparatus has two circular plates disposed on a shaft, with a cutting surface on one face of each plate. The shaft is rotably and slidably disposed within two conical mandrels which non-threadably engage the threads of the box connection. The mandrels are spring biased toward one end of the apparatus. The apparatus is positioned with the mandrels within the box connection, bearing against the thread crests. The shaft is rotated and pushed toward the connection, bringing the cutting means into rotating contact with the seal shoulders of the connection, for resurfacing and alignment of the seal shoulders. For pin connections, the shaft is connected to a drum having circular plates at each end. The circular plates carry cutting surfaces. Two guide plates having conical thoroughbores are carried within the drum, and may rotate and slide linearly within the drum. The guide plates are spring biased toward one end of the drum. The pin connection is inserted into the drum so that the guide plates bear on the thread crests of the pin connection. A rotary driver rotates the shaft, the shaft is advanced toward the connection, and the circular plates having cutting surfaces disposed thereon are brought into rotating contact with the seal shoulders of the pin connection for resurfacing and alignment.

18 Claims, 10 Drawing Sheets

APPARATUS FOR RECONDITIONING THREADED TUBULAR CONNECTION SEAL SHOULDERS

BACKGROUND—FIELD OF INVENTION

This invention relates to apparatus for reconditioning used tubular members. With greater particularity, this invention relates to apparatus for restoring sealing shoulders of tubular members having threaded connections, where the female threaded connection has at least one seal shoulder and the male threaded connection has at least one seal shoulder, upon threaded engagement of the two parts of the connection the shoulders contacting one another and forming a pressure seal.

BACKGROUND—DESCRIPTION OF THE RELATED ART

Tubular members, such as are those used in oilfield applications, are often joined by threaded connections. In this manner, sections or "joints" of drill pipe, tubing and the like, which are typically in lengths of 1 to 45 feet, may be joined to make "strings" of drill pipe or tubing many thousands of feet long. It is important that the threaded connections maintain the pressure integrity of the entire string.

A threaded connection comprises a female or "box" connection and a male or "pin" connection, with the pin threadably engaging the box to form the connection. One sealing means employed in several types of threaded connections is to provide at least one peripheral sealing shoulder on the box connection and a mating peripheral sealing shoulder on the pin connection. When the connection is threadably engaged, or "made up", the two shoulders are brought together and form a seal. Some connection designs have more than one sealing shoulder on each of the box and pin connections, such as a pair of sealing shoulders on each connection, which form multiple seals when the connection is made up. Some connections have a "stop" profile in the box with a mating part on the pin connection. Such connections are intended for relatively high torque values, with the stop profiles permitting the higher torque to be imposed on the connection.

A problem arises after use of the tubular members in well operations, where the connections may be repeatedly made up and broken, with corresponding repeated shoulder-to-shoulder contact and wear. The resulting wear may result in sealing shoulders that are scored or that no longer present a flat planar surface at right angles to the longitudinal axis of the tubular. When such conditions occur, even when a connection is torqued to required specification, the shoulder-to-shoulder contact may not form a pressure seal. To remedy this problem, the sealing shoulders must be reconditioned, or resurfaced, so as to remove scoring and other surface imperfections, and to bring the sealing shoulders once again into a smooth planar surface at right angles to the longitudinal axis of the tubular good.

Prior attempts to carry out this reconditioning procedure have generally employed apparatus that were time consuming and expensive to use. For example, certain apparatus were designed to be employed in a shop environment, where the tubular had to be transported from a field location to a shop or warehouse environment for reconditioning. This transportation of course results in greatly increased costs due to transportation costs and time losses. Other apparatus were designed to be employed in the field, but required that the resurfacing apparatus be threadably engaged with the female or male connection to be reconditioned. Such apparatus generally employ a male or female threaded "guide", to engage the box or pin connection, respectively, and provide a means for mounting the apparatus. The threading of the apparatus guide on and off of the connection is very time consuming. Further, in order to properly engage the threaded guide, the threads of the connection need to be reasonably clean, and often time consuming cleaning of the threads is required before such apparatus may be used. An example of such apparatus is disclosed in U.S. Pat. No. 3,181,398 to Rogers (May 4, 1965). Rogers discloses a device that utilizes essentially "full size" pin or box threaded mandrels, as the case may be, the mandrels engaged onto the connection to be reconditioned and providing a base for attachment of the cutting tool. Only one seal shoulder may be reconditioned with the apparatus in Rogers patent. Another similar apparatus is that disclosed in U.S. Pat. No. 3,561,302 to Keener (Feb. 9, 1971), which also describes an apparatus for reconditioning the seal shoulder of a single-seal threaded connection. The apparatus in Keener requires engagement of multiple teeth carried on three "snag heads" into the threads of the connection (either box or pin) to properly align the tool. Such arrangement is time consuming and subject to inaccuracies in alignment should the snag heads not be uniformly positioned. Both the Rogers and Keener patents require full or partial threaded engagement of the alignment device with the threads of the connection to be reconditioned, which is time consuming and often requires sufficient cleaning of the threads so that proper engagement into the connection may be made. In addition, both apparatus teach resurfacing of only a single seal shoulder connection.

The present invention overcomes the disadvantages presented by the related art. Threaded tubular connections having single or multiple sealing shoulders may be reconditioned at field locations without the necessity of bringing the tubulars to a centralized, shop location, by rapid resurfacing of the seal shoulders with rotary cutting means. In addition, time consuming threaded engagement of the resurfacing apparatus with the threaded connection is avoided. The apparatus is placed in proper alignment with the seal shoulders by mandrels or guide plates which are not threadably engaged with the threaded connection, but rather are positioned within or around the box or pin connection, as the case may be, and held in place by spring force against the crests of the threads. No extensive cleaning of the threaded connection is required to permit the mandrels or guide plates to seat properly. Further, multiple shoulders on a connection, whether multiple seal shoulders or seal shoulders and stop shoulders, are resurfaced simultaneously, with a single engagement of the apparatus. In such manner, the time required to engage and disengage the apparatus and to resurface the shoulders of a threaded tubular connection is greatly reduced. In addition, threaded connections having only a single shoulder may also be refaced by the apparatus of the present invention. The apparatus may also be positioned, on a box connection, by seating the mandrels in the counterbore area (a non-threaded section at the front of the connection) and any non-threaded area at the rear of the connection or the entrance to the tube; or on a pin connection by seating a guide plate at the rear of a pin connection and a mandrel in the pin bore. Means may be provided to control the longitudinal travel of the cutting surfaces and thus control the amount of material removed from the seal shoulders.

OBJECTS AND ADVANTAGES

Accordingly, besides the objects and advantages of the apparatus for reconditioning threaded connection seal shoulders described above, several objects and advantages of the present invention are:

(a) to provide an apparatus for reconditioning the seal shoulders of threaded tubular connections which is easily transported to and employed in field locations, saving time consuming and expensive transport of tubulars from the field to a shop;

(b) to provide an apparatus for reconditioning the seal shoulders of threaded tubular connections which engages the threaded connection for proper alignment of the resurfacing tool, without requiring engagement of a threaded section into the threads of the connection to be reconditioned;

(c) to provide an apparatus for reconditioning the seal shoulders of threaded tubular connections having single seal shoulders in a rapid, cost effective manner, (d) to provide an apparatus for reconditioning the seal shoulders of threaded tubular connections which simultaneously resurfaces multiple seal shoulders or multiple shoulders in a single run; and (e) to provide an apparatus for reconditioning the seal shoulders of threaded tubular connections which positively limits travel of the cutting apparatus to a selected value.

Further objects and advantages are to provide an apparatus for reconditioning the seal shoulders and stop shoulders of threaded tubular connections which is easy and economical to manufacture, and sufficiently lightweight for manual deployment by field personnel. Still further objects and advantages will become apparent from a consideration of the ensuing description and drawings.

SUMMARY OF THE INVENTION

The present invention comprises an apparatus for resurfacing of box and pin threaded tubular connections having sealing shoulders. The apparatus adapted to both box and pin connections comprises a shaft and means for positioning the shaft concentric with the longitudinal axis of a threaded tubular. At least one generally circular plate having an abrasive surface or cutting tool (for example, of steel, tungsten, or ceramic) on one side of the plate is coupled to the shaft. The diameter of the plate is sufficient to place the abrasive surface in alignment with the seal shoulder. The axis of the plate is common with the longitudinal axis of the shaft, and the face of the plate is perpendicular to the longitudinal axis of the shaft. After engagement of the positioning means with the threaded connection, means for rotating the shaft, which may be hand operated or powered by electricity, hydraulics or air, commence rotation of the shaft and plate. The shaft and plate are then advanced so that the abrasive surface or cutting tool contacts the seal shoulder. In this manner, an appropriate amount of material is removed to restore the seal surface and place the seal surface in proper planar alignment, perpendicular with the longitudinal axis of the tubular. Two plates may be provided for simultaneous resurfacing of both shoulders of a two shoulder connection, the longitudinal spacing of the plates corresponding to the longitudinal spacing of the seal shoulders. The means for positioning the shaft comprises at least one bearing member for disposition against the threads of the connection. For box connections, the means for positioning the shaft comprises a pair of spring-biased mandrels, each in the shape of a truncated cone, which fit within the box connection and bear against the crests of the threads. The diameter and taper of the mandrels corresponds to the diameter and taper of the crests of the threads of the box connection. For pin connections, the means for positioning the shaft comprises a pair of guide plates having central, conical, tapered bores, which fit over the pin connection threads and bear against the crests of the pin threads. The diameter and taper of the bores corresponds to the diameter and taper of the crests of the pin connection.

DESCRIPTION OF THE PREFERRED EMBODIMENTS

Figure 1:
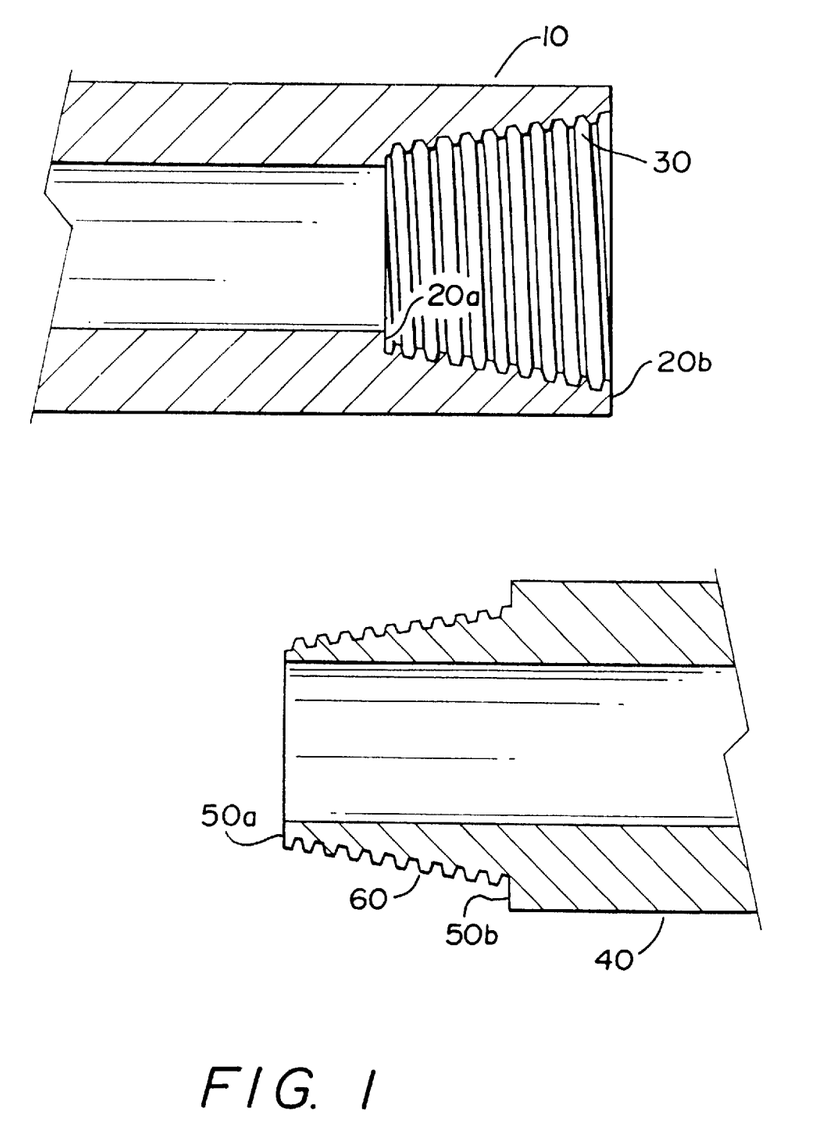
FIG. 1 is a schematic of box and pin connections having dual sealing shoulders, or one seal shoulder and one stop shoulder.
Figure 2:
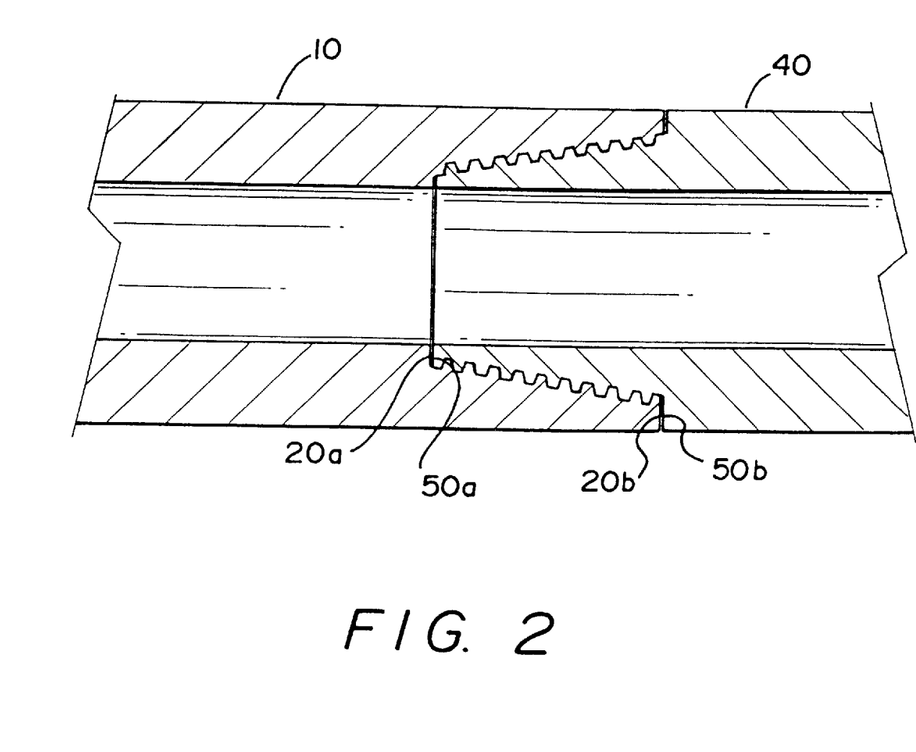
FIG. 2 is a schematic of an engaged pin and box threaded connection.

FIGS. 1 and 2 show a box connection 10, pin connection 40, and fully engaged threaded connection. Box connection 10 has dual shoulders 20a and 20b, which comprise peripheral shoulders lying on a plane generally perpendicular to the longitudinal axis of the tubular member. Threads 30 permit engagement with the pin connection, described hereinafter. It is understood that box connection 10 may have only one seal shoulder, in such case typically in the location of shoulder 20b, both shoulders may function as seal shoulders, or one shoulder may function as a seal shoulder with the other shoulder functioning as a stop shoulder.

Pin connection 40, having dual seal shoulders 50a and 50b, which as in box connection 10 comprise peripheral shoulders lying on a plane generally perpendicular to the longitudinal axis of the tubular. Threads 60 permit engagement with threads 30 of pin connection 10. It is understood that pin connection 40 may have only one seal shoulder, in such case typically in the location of shoulder 50b, may have one stop shoulder and one seal shoulder, or may have two seal shoulders as shown herein. FIG. 2 shows box connection 10 and pin connection 40 in full threaded engagement, with the mating seal shoulders 20a, 50a and 20b, 50b providing pressure seals.

Figure 3:
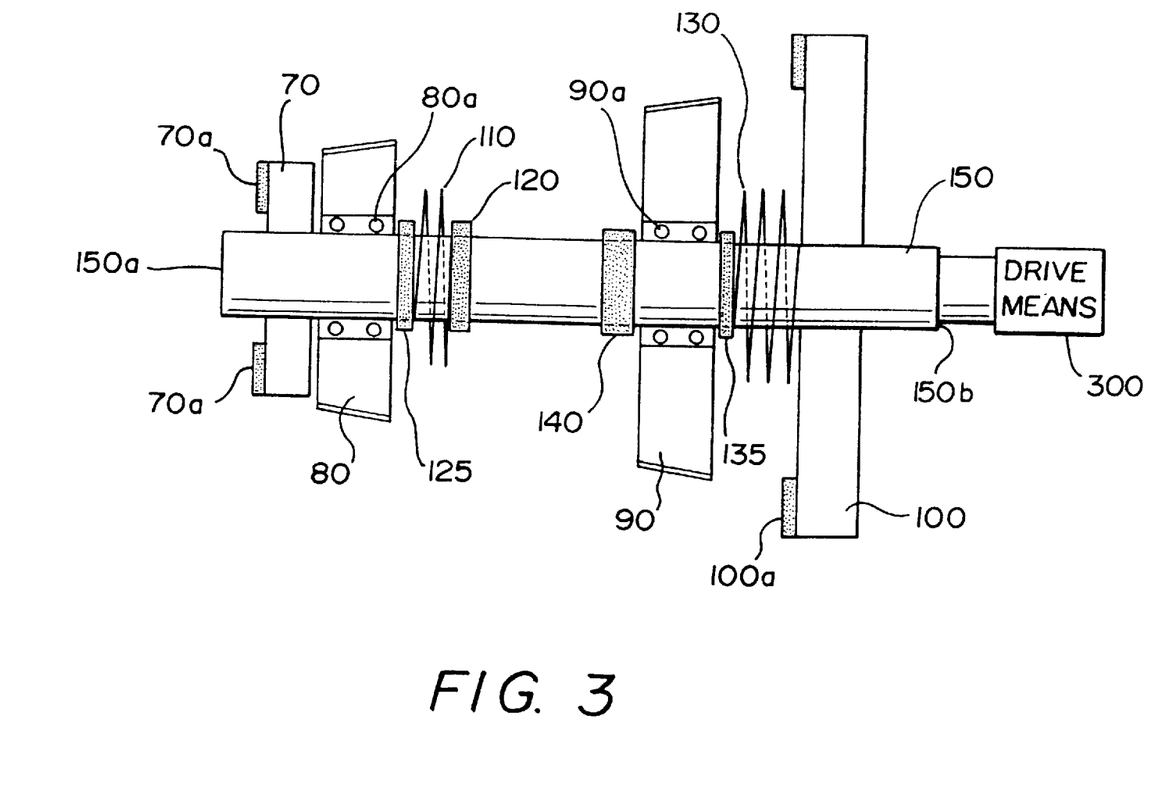
FIG. 3 is a schematic of an embodiment of the present invention for resurfacing box connections.

An embodiment of the present invention, particularly adapted for reconditioning pin connections, will be described first with reference to FIG. 3. Shaft 150 carries a first mounting plate 70 and second mounting plate 100, both shown in cross section. Each plate is generally circular, and may be made of steel or other suitable material. The longitudinal spacing of first and second mounting plates 70 and 100 along shaft 150 is equal to the longitudinal spacing of the two seal shoulders of a dual seal box connection, 20a and 20b in FIG. 1. About the outer peripheral edge of first and second mounting plates 70 and 100 are cutting surfaces 70a and 100a, respectively, forming ring-shaped cutting surfaces. The diameter of the cutting surfaces thus formed corresponds to the diameter of the seal shoulders to be resurfaced. The cutting surface may be of sandpaper bonded to the plate with adhesive or an abrasive aggregate embedded in epoxy. Also, devices such as metal files, or cutting tools of steel, tungsten, or ceramic may be fixed to the mounting plates. First and second mounting plates 70 and 100 are mounted to shaft 150 by bolting or other like means, such that the plates and the shaft all have a common central axis and the plates lie on planes at right angles to the axis of the shaft, and no relative movement occurs between the plates and shaft 150. It is understood that in the case of a box connection having only one seal shoulder, only one mounting plate is provided on shaft 150.

Shaft 150 is connected to means for positioning the shaft concentric with the longitudinal axis of the tubular. In the preferred embodiment, this means for positioning the shaft comprises at least one bearing member for disposition against the threads of the connection, and in this embodiment more particularly comprises a pair of mandrels. Disposed on shaft 150 are first and second mandrels 80 and 90, shown in cross section. First and second mandrels 80 and 90 have central holes therethrough so that both mandrels may both rotate and slide freely on shaft 150. The mandrels may be made of aluminum, steel, composites, or other appropriate material. In addition, the mandrels may be covered with hard materials such as tungsten or chrome. In the preferred embodiment, the mandrels are mounted on bearing assemblies 80a and 90a, which provide low friction relative rotation between mandrels 80 and 90 and shaft 150, along with low friction longitudinal movement. Bearing assemblies 80a and 90a may be ball or roller bearings or may be bearing surfaces of a low friction material, such as a polymer. It is understood that mandrels 80 and 90 may be mounted on shaft 150 without a bearing assembly, if desired. Both mandrels 80 and 90 are biased toward a first end 150a of shaft 150 by springs 110 and 130. In this embodiment, spring 110 bears against spring stop 120 and spring retainer 125, with spring retainer 125 in turn bearing against bearing assembly 80a; and spring 130 bears against second mounting plate 100 and spring retainer 135, with spring retainer 135 bearing in turn against bearing assembly 90a. This permits proper engagement of the apparatus within the box connection, as will be described. Travel of mandrels 80 and 90 toward first end 150a of shaft 150 is controlled by first mounting plate 70 and mandrel stop 140.

Figure 4:
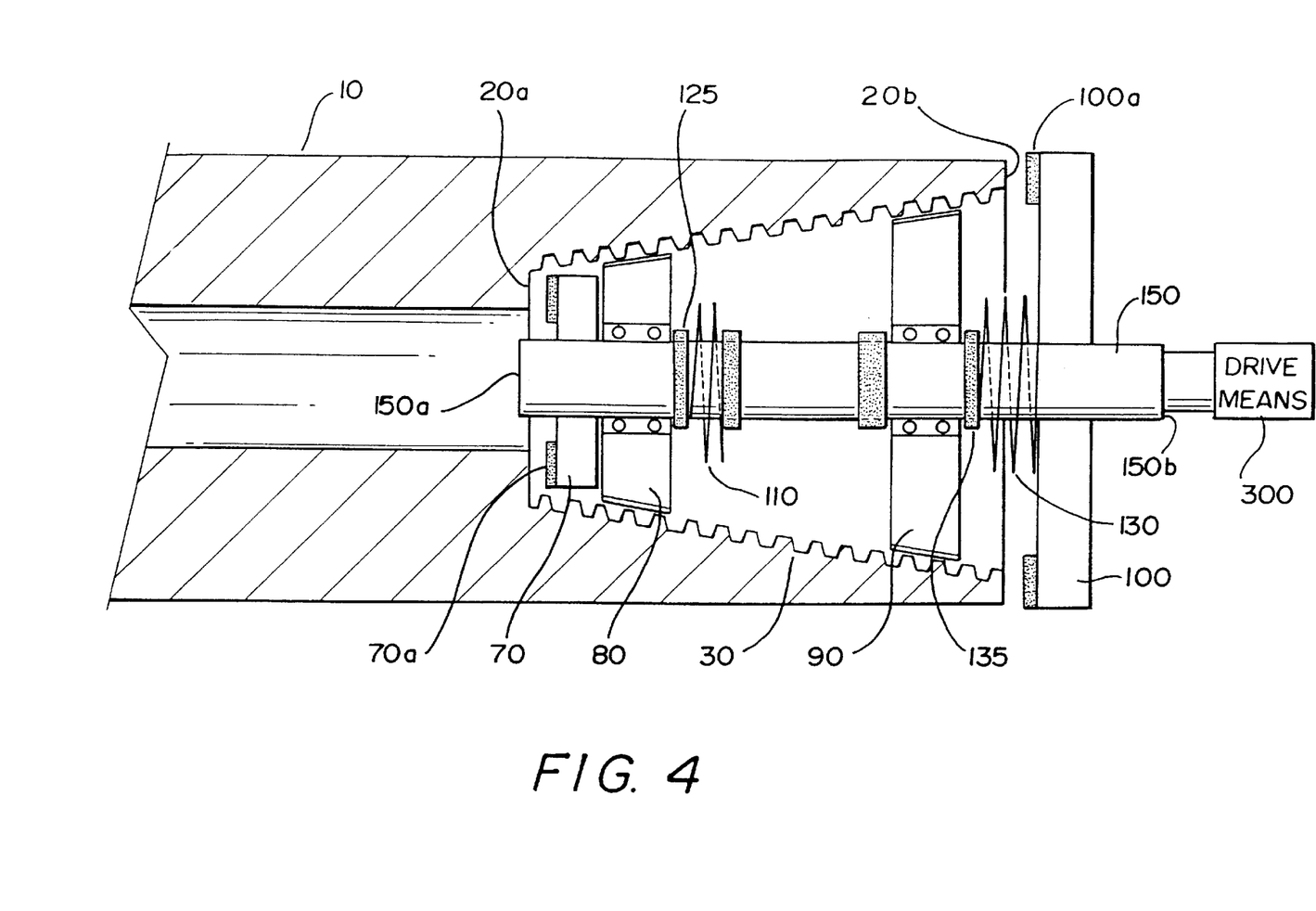
FIG. 4 is a schematic of an embodiment of the present invention in partial engagement within a box connection.
Figure 5:
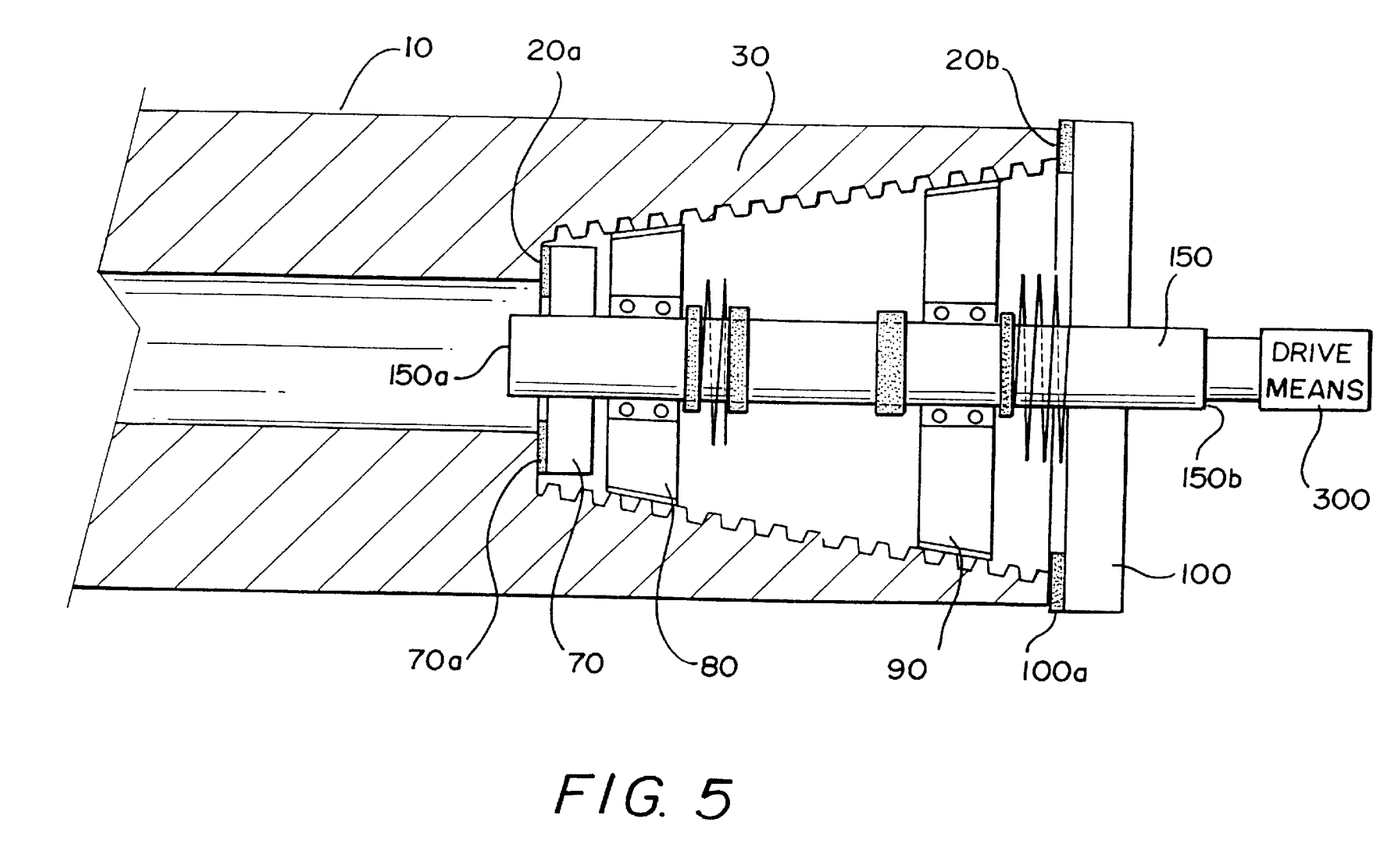
FIG. 5 is a schematic of an embodiment of the present invention in full engagement within the box connection.

Resurfacing of a box connection is done by engaging the apparatus within a box connection, as shown in FIG. 4. The apparatus is inserted until mandrels 80 and 90 bear against the crests of threads 30. The diameter and taper of mandrels 80 and 90 are configured as appropriate for the connection being reconditioned. The longitudinal spacing of mandrels 80 and 90 spans a sufficient portion of the box connection to provide a firm positioning for the apparatus. In the position shown in FIG. 4, cutting surfaces 70a and 100a are not yet in contact with seal shoulders 20a and 20b. Next, rotation of shaft 150 is commenced by means for rotating the shaft, in the preferred embodiment comprising drive means 300, which may be hand operated, or rotary power drive means such electric, hydraulic, or air powered, connected to second end 150b of shaft 150. By applying longitudinal force to shaft 150 sufficient to overcome the spring forces of springs 110 and 130, shaft 150 is then advanced, along with first and second mounting plates 70 and 100 and cutting surfaces 70a and 100a, until cutting surfaces 70a and 100a contact seal shoulders 20a and 20b and commence the resurfacing process. This position is shown in FIG. 5. Appropriate longitudinal force is applied to shaft 150 to effect the resurfacing process. When sufficient material is removed, and the surfaces of seal shoulders 20a and 20b are free of surface imperfections and present a planar surface perpendicular to the longitudinal axis of the tubular, then the resurfacing process is complete. It is understood that the exact sequence of commencement of rotation and longitudinal transfer is by way of example only, and the cutting surfaces could be placed in contact with the seal shoulders before rotation is commenced.

Figure 6:
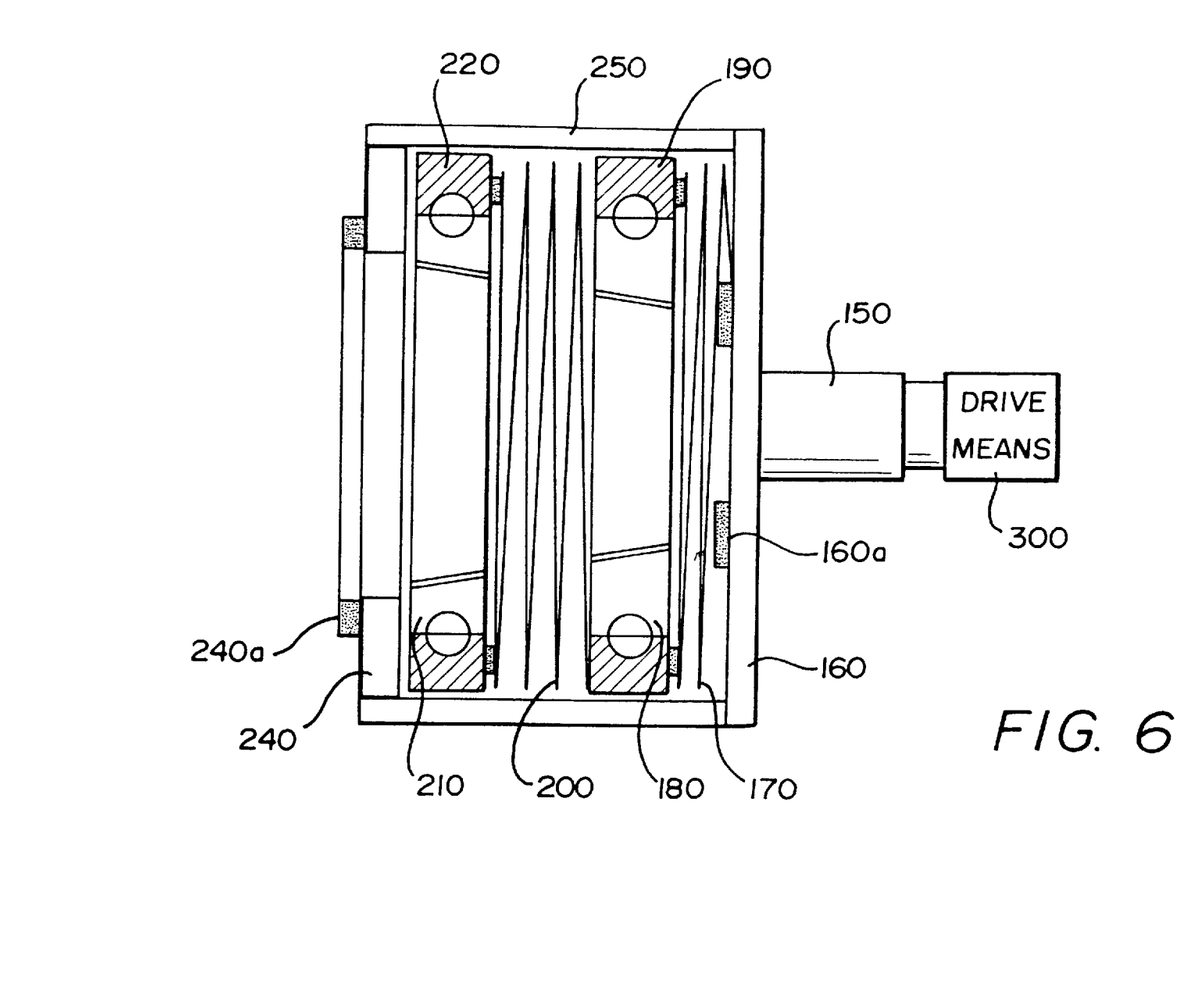
FIG. 6 is a schematic of an embodiment of the present invention for resurfacing pin connections.

An embodiment of the present invention for reconditioning pin connections is next described, with reference to FIG. 6. Shaft 150 is connected to a generally circular first mounting plate 160, having cutting surface 160a thereon in a circular pattern. A cylindrical drum 250 is connected to first mounting plate 160. A second mounting plate 240 with cutting surface 240a is connected to the end of drum 250 opposite first mounting plate 160. As with the box connection tool, first and second mounting plates 160 and 240 are on a common axis with the longitude of shaft 150 and lie on planes at right angles to the longitudinal axis of shaft 150. No relative movement between the plates and the shaft may occur. Cutting surfaces 160a and 240a form ring-shaped surfaces having diameters appropriate for the seal shoulders to be resurfaced. The longitudinal spacing between cutting surfaces 160a and 240a matches the longitudinal spacing of seal shoulders 50a and 50b of a pin connection. It is understood that to recondition a connection having only a single seal shoulder, only one mounting plate and cutting surface need be provided. Cutting surfaces 160a and 240a may be of sandpaper, cutting tools, or other suitable material, as described above for the box connection tool.

Means for positioning shaft 150 concentric with the longitudinal axis of the tubular are provided, comprising at least one bearing member for disposition against the threads of the connection, and in this embodiment more particularly comprises first and second guide plates 180 and 210 mounted in bearing assemblies 190 and 220, which are in turn mounted within drum 250. First and second guide plates 180 and 210 may thereby freely rotate with respect to shaft 150 and drum 250, and may also move longitudinally within drum 250. In such fashion, relative rotational and translational movement between first and second guide plates 180 and 210 and shaft 150 may be effected. As in the box connection tool described above, bearing assemblies 190 and 220 may be ball or roller bearings, polymeric or other like bearings as described above for the box connection tool, although it is understood that no separate bearing must be provided. First and second guide plates 180 and 210 are biased toward second mounting plate 240 by springs 170 and 200, which bear against bearing assemblies 190 and 220 and first mounting plate 160. First and second guide plates 180 and 210 have central, tapered bores therein, with the diameter and taper of the bores corresponding to the diameter and taper of the threads of the pin connection to be reconditioned. As with the box connection tool, the guide plates may be made of aluminum or other metal, composite, or other suitable material, and may be covered with tungsten, chrome, or other hard materials.

Figure 7:
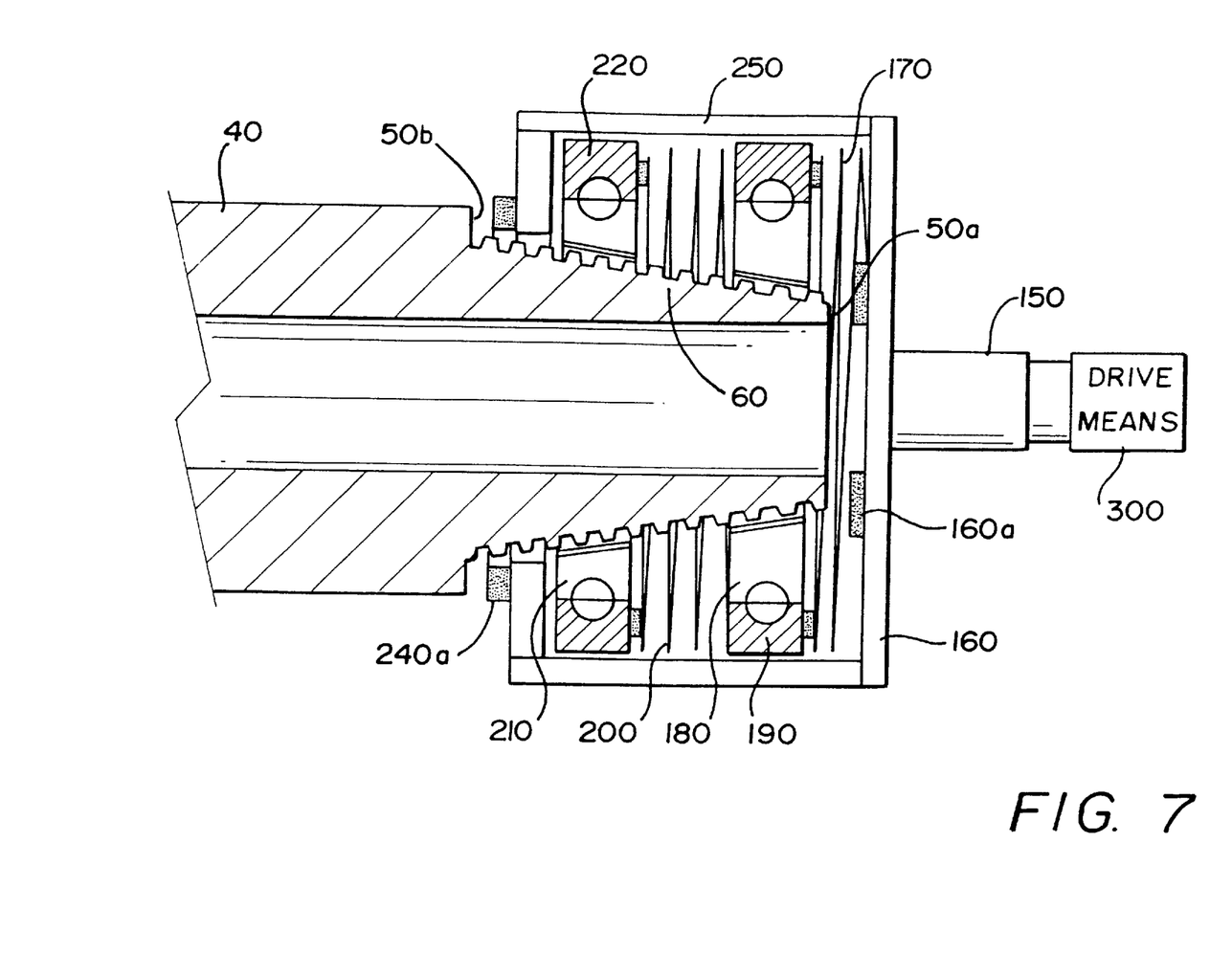
FIG. 7 is a schematic of an embodiment of the present invention in partial engagement about the pin connection.
Figure 8:
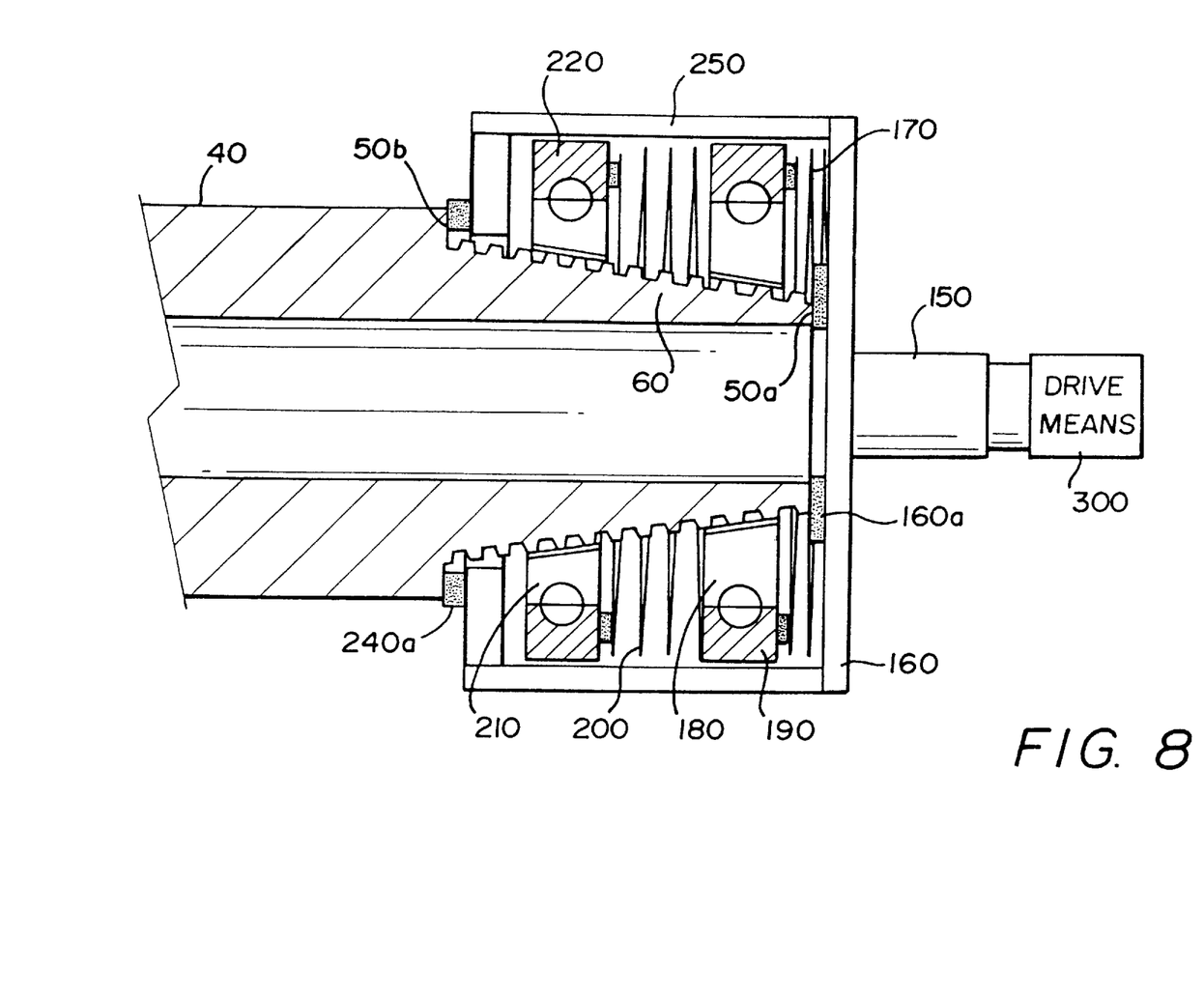
FIG. 8 is a schematic of an embodiment of the present invention in full engagement about the pin connection.

Operation of the pin connection tool, similar to that of the box connection tool, is now described. FIG. 7 shows the pin connection tool in partial engagement on a pin connection, with guide plates 180 and 210 bearing on the crests of threads 60. Cutting surfaces 160a and 240a are not in contact with seal shoulders 50a and 50b. Rotation of shaft 150 is commenced with means for rotating the shaft, which in the preferred embodiment comprises drive means 300, which may be hand operated or powered by electric, hydraulic, or other power rotary drive means. Longitudinal force is applied to shaft 150 sufficient to overcome the forces of springs 170 and 200, and cutting surfaces 160a and 240a are advanced into contact with seal shoulders 50a and 50b, as in FIG. 8. As with operation of the box connection tool described above, sufficient cutting force and duration are applied to remove surface imperfections in seal shoulders 50a and 50b and bring the planar surfaces of the seal shoulders perpendicular to the longitudinal axis of the tubular member.

It is further understood that the apparatus may also be positioned, on a box connection, by seating the mandrels in the counterbore area (any non-threaded section at the front of the connection) and any non-threaded area at the rear of the box connection or the entrance to the bore of the tubular; or on a pin connection by seating a guide plate at the rear of a pin connection and a mandrel in the pin bore.

Figure 9:
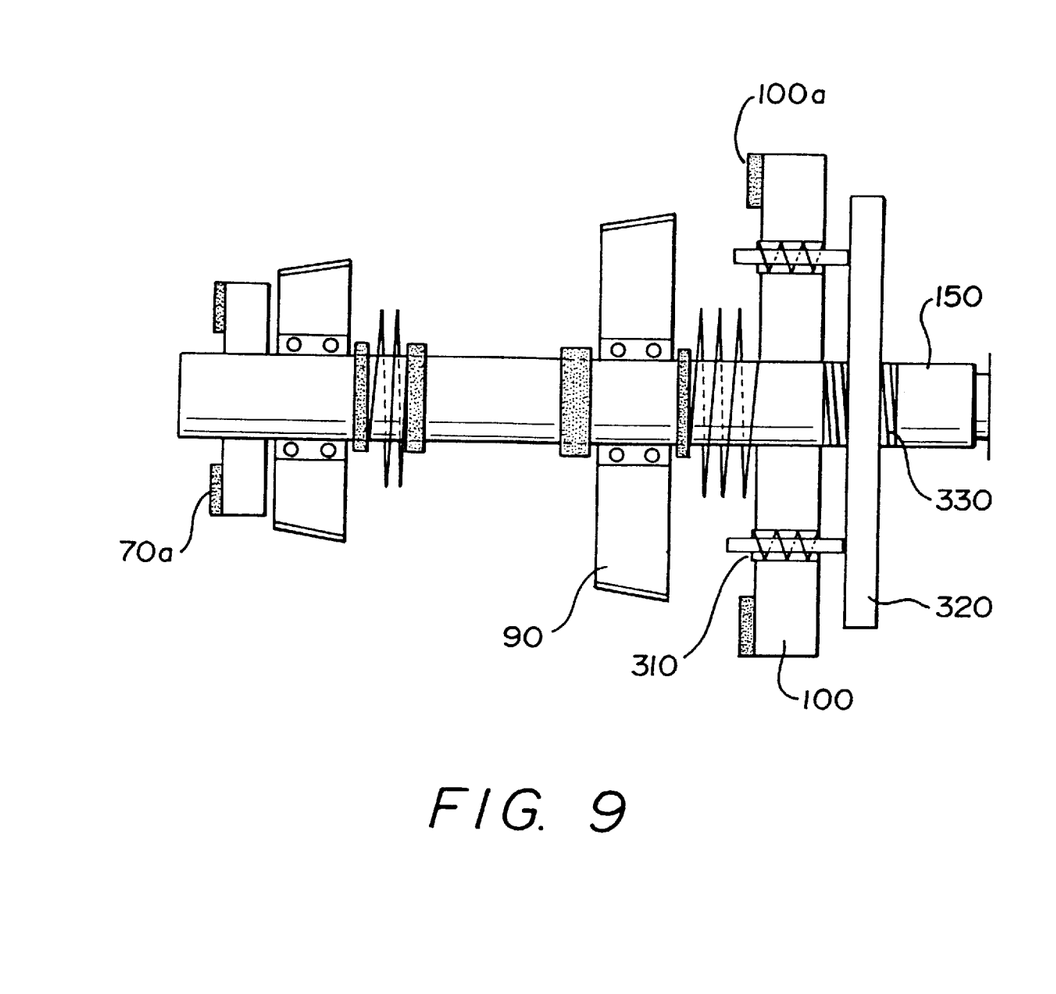
FIG. 9 is a schematic of an embodiment of the present invention for resurfacing box connections, comprising positive cutting surface stop means.
Figure 10:
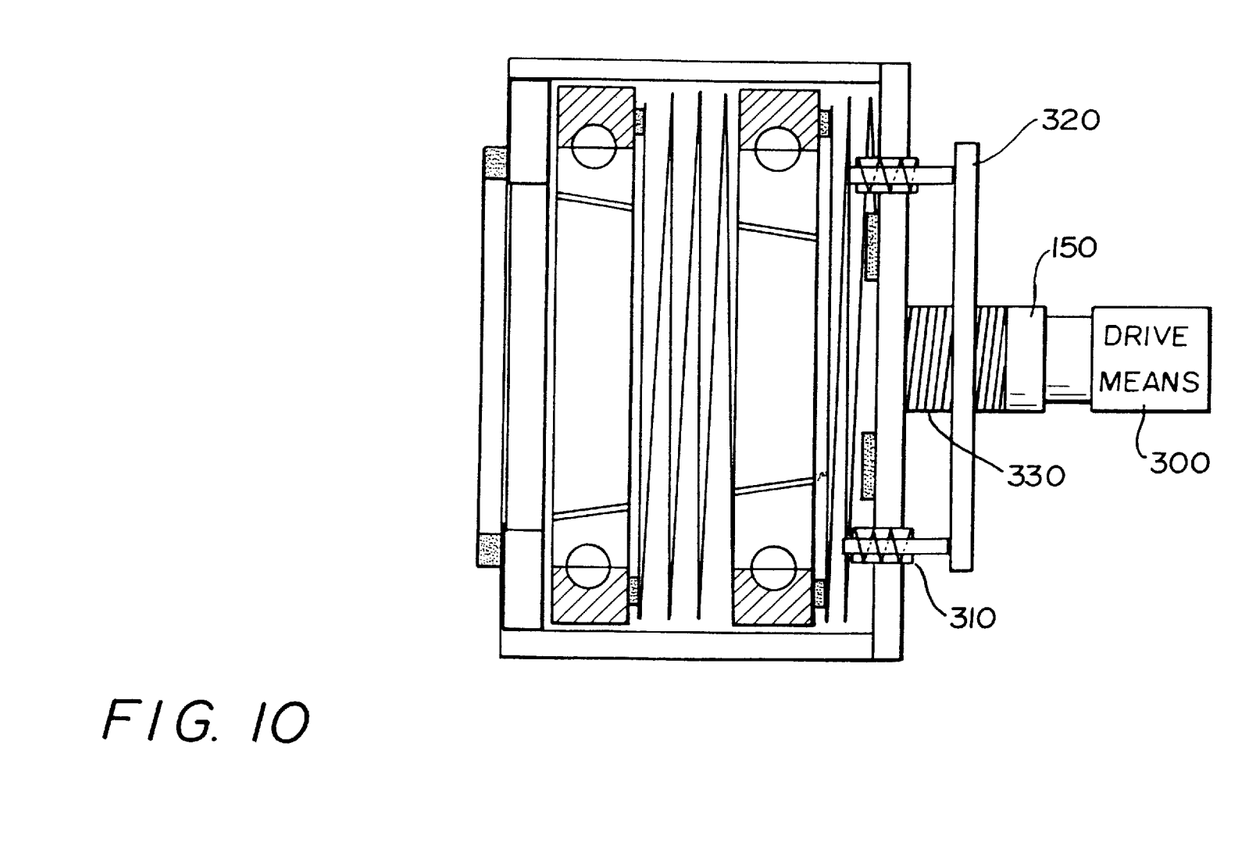
FIG. 10 is a schematic of an embodiment of the present invention for resurfacing pin connections, comprising positive cutting surface stop means.

Other embodiments of the present invention are possible. For example, in the box connection tool, a single, longer mandrel could be used in lieu of two spaced apart mandrels. In another embodiment, the mandrels could comprise sections of truncated spheres in place of the truncated cones. Also, on both box and pin tools, appropriate angles could be formed with one or both cutting surfaces to that seal shoulders having planar surfaces not at right angles to the longitude of the tubular, could be resurfaced. Another embodiment incorporates positive stop means to limit the amount of material that may be removed from the seal shoulder. FIGS. 9 and 10 show box and pin connection tools, respectively, having positive stop means. With reference to FIG. 9, showing the box connection tool, plunger means 310 are disposed in second mounting plate 100. Preferably, three plunger means 310 are provided, spaced equally around first mounting plate 100, although it is understood that greater or fewer plunger means could be employed. By rotating adjustment plate 320 along threads 330 on shaft 150 to a desired position, plunger means 310 are forced toward mandrel 90, thus controlling how far shaft 150 and consequently cutting surfaces 70a and 100a may travel. With knowledge of the lead of thread 330, it is possible to precisely control how much travel of the cutting surfaces will be allowed through rotation of adjustment plate 320, which further comprises lock means (not shown) for locking adjustment plate 320 in place. In similar fashion, with reference to FIG. 10, the pin connection tool may comprise the positive stop means, with consistent part numbering with the apparatus in FIG. 9

Although the description above contains many specificities, these should not be construed as limiting the scope of the invention, but as merely providing illustrations of some of the presently preferred embodiments. Thus the scope of the invention should be determined by the appended claims and their legal equivalents, than by the examples given.

I claim:

1. An apparatus for reconditioning shouldered threaded tubular connections, comprising:

a) a shaft having a central longitudinal axis;

b) means for positioning said shaft along a central longitudinal axis of a tubular member while permitting axial movement of said shaft along said longitudinal axis of said tubular member, wherein said means for positioning said shaft comprises at least two bearing members, each of said at least two bearing members having an unthreaded bearing surface for disposition against a plurality of thread crests in a threaded connection;

c) at least one plate disposed on said shaft, said plate comprising first and second faces, the center of said plate on said longitudinal axis of said shaft, said first and second faces of said plate disposed substantially perpendicular to said longitudinal axis of said shaft, one of said faces having cutting means disposed thereon; and d) means for rotating said shaft.

2. The apparatus of claim 1, wherein said apparatus comprises two generally circular plates disposed in spaced-apart relationship on said shaft, at least one face of each of said circular plates having cutting means disposed thereon.

3. The apparatus of claim 2, further comprising means for limiting said axial movement of said shaft along said longitudinal axis of said tubular good.

4. An apparatus for resurfacing a rotary shouldered threaded box connection, comprising:

a) a shaft having a central longitudinal axis;

b) at least one generally circular plate disposed on said shaft, said plate comprising first and second faces, the center of said plate on said longitudinal axis of said shaft, said first and second faces of said plate perpendicular to said longitudinal axis of said shaft, one of said faces having cutting means disposed thereon;

c) at least one mandrel with a central throughbore rotably and slidably disposed on said shaft, said mandrel having the shape of a truncated cone and a non-threaded exterior surface for non-threaded engagement against a plurality of thread crests in a box connection, and a spring disposed on said shaft, said spring biasing said mandrel toward an apex of said truncated cone; and d) means for rotating said shaft.

5. The apparatus of claim 4, wherein said apparatus comprises two of said generally circular plates disposed on said shaft, at least one face of each of said plates having cutting means disposed thereon.

6. The apparatus of claim 5, wherein said apparatus comprises at least two of said mandrels disposed on said shaft in spaced-apart relation.

7. The apparatus of claim 4, wherein said apparatus comprises at least two of said mandrels disposed on said shaft in spaced-apart relation.

8. The apparatus of claim 4, further comprising bearing means disposed between said shaft and said mandrel.

9. The apparatus of claim 8, wherein said bearing means comprises caged ball bearings.

10. The apparatus of claim 4, further comprising means for limiting relative axial movement between said shaft and said mandrel.

11. The apparatus of claim 10, wherein said means for limiting relative axial movement between said shaft and said mandrel comprises a plate threadably disposed on said shaft and plunger means disposed in said plate.

12. An apparatus for resurfacing a rotary shouldered threaded pin connection, comprising:

a) a shaft having a central longitudinal axis;

b) a first generally circular plate disposed on said shaft concentric with said longitudinal axis of said shaft, said plate having at least one face perpendicular to said longitudinal axis of said shaft;

c) a cylindrical drum having first and second ends, said first end of said drum attached to said first circular plate, said drum concentric with said longitudinal axis of said shaft;

d) a second circular plate attached to said second end of said drum, concentric with said longitudinal axis of said shaft, said second circular plate having cutting means disposed thereon forming a circular cutting pattern about said longitudinal axis of said shaft;

e) at least one guide plate slidably and rotably disposed within said drum, said guide plate having a generally circular shape and a conical throughbore, said throughbore having a non-threaded surface for disposition on a plurality of crests of the threads of a pin connection, and a spring disposed within said drum, said spring biasing said guide plate toward a base of a cone defined by said throughbore; and f) means for rotating said shaft.

13. The apparatus of claim 12, further comprising cutting means disposed on a face of said first circular plate, said cutting means forming a circular cutting pattern about said longitudinal axis of said shaft.

14. The apparatus of claim 13, wherein said apparatus comprises two guide plates slidably and rotably disposed within said drum in spaced apart relationship, each of said guide plates having a generally circular shape and a conical throughbore, each of said guide plates being spring biased toward a base of said cone.

15. The apparatus of claim 12, wherein said apparatus comprises two guide plates slidably and rotably disposed within said drum in spaced apart relationship, each of said guide plates having a generally circular shape and a conical throughbore, each of said guide plates spring being biased toward a base of said cone.

16. The apparatus of claim 12, further comprising bearing means disposed between said drum and said guide plate.

17. The apparatus of claim 16, wherein said bearing means comprises caged ball bearings.

18. The apparatus of claim 12, further comprising means for limiting the axial movement of said shaft with respect to said guide plate.

\* \* \* \* \*